United States Patent [19]

Dan et al.

[11] 4,424,960
[45] Jan. 10, 1984

[54] RUBBER VIBRATION ISOLATORS

[75] Inventors: Takuya Dan; Akio Fujita, both of Yokohama, Japan

[73] Assignee: Bridgestone Tire Company Limited, Tokyo, Japan

[21] Appl. No.: 274,568

[22] Filed: Jun. 17, 1981

[30] Foreign Application Priority Data

Jun. 23, 1980 [JP] Japan .................................. 55-84773
Jul. 12, 1980 [JP] Japan .................................. 55-94565

[51] Int. Cl.³ ............................................. F16F 9/10
[52] U.S. Cl. .................................. 267/8 R; 267/63 R; 267/140.1; 267/140.5; 267/141; 267/153; 248/562
[58] Field of Search .................. 267/140.1, 140, 63 R, 267/140.4, 153, 141, 141.1, 152, 64.23, 64.24, 35, 8 R, 121, 122, 140.5; 248/562, 632

[56] References Cited

U.S. PATENT DOCUMENTS

| | | | |
|---|---|---|---|
| 1,822,026 | 9/1931 | Guy | 267/63 R |
| 2,502,322 | 3/1950 | Iredell, Jr. | 267/140.1 |
| 2,582,998 | 1/1952 | Lee | 267/140.1 |
| 2,919,883 | 1/1960 | Murphy | 267/122 |
| 3,642,268 | 2/1972 | Hipsher | 267/57.1 R |
| 3,947,007 | 3/1976 | Pelat | 267/140.4 |
| 4,161,304 | 7/1979 | Brenner et al. | 267/35 |
| 4,199,128 | 4/1980 | Van Den Boom et al. | 248/562 |
| 4,262,886 | 4/1981 | LeSalver | 267/8 R |

FOREIGN PATENT DOCUMENTS 2041485 8/1980 United Kingdom ............... 267/121

Primary Examiner—Bruce H. Stoner, Jr.
Assistant Examiner—R. R. Diefendorf
Attorney, Agent, or Firm—Sughrue, Mion, Zinn, Macpeak & Seas

[57] ABSTRACT

A rubber vibration isolator is disclosed, which comprises a pair of upper and lower liquid chambers capable of changing volumes by elastic deformation of an annular rubber elastomer accompanied with longitudinal vibration, a restricted passage for communicating these chambers with each other, at least two liquid chambers formed in the outer periphery of the elastomer and capable of changing volumes accompanied with lateral vibration, and another restricted passage for communicating the latter chambers with each other.

5 Claims, 9 Drawing Figures

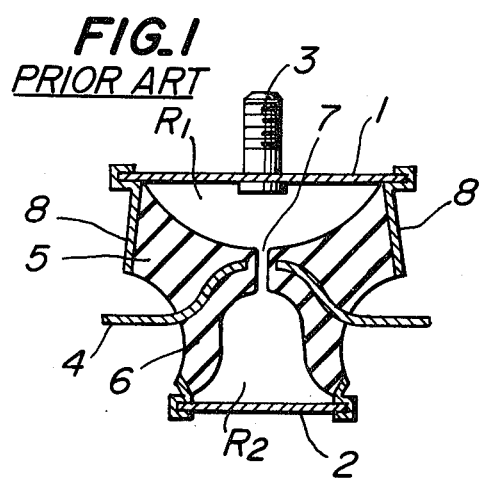
FIG_1 PRIOR ART
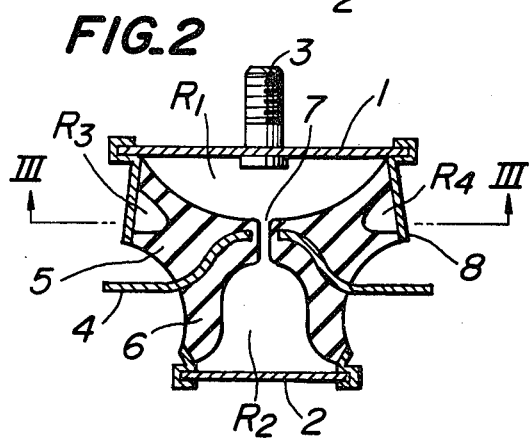
FIG_2
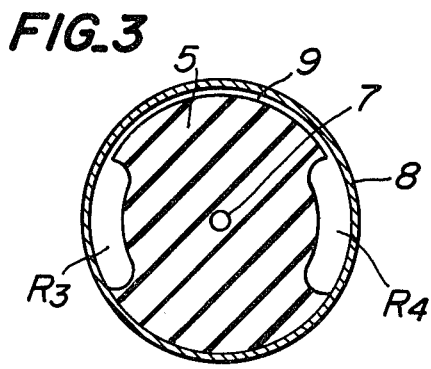
FIG_3

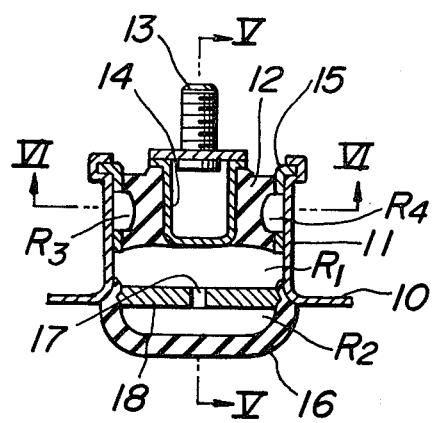
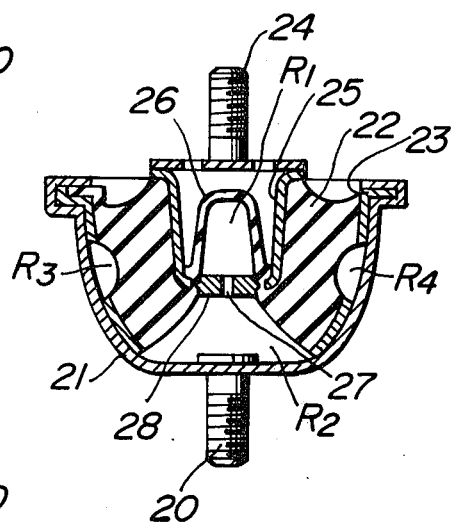
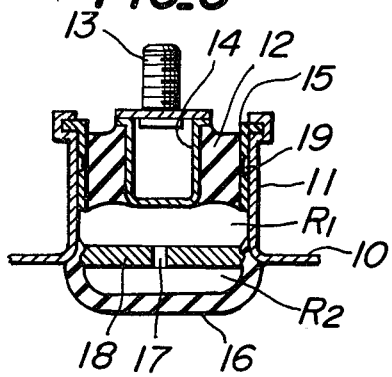
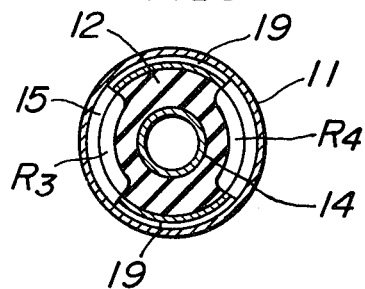

RUBBER VIBRATION ISOLATORS

This invention relates to rubber vibration isolators, and more particularly to rubber vibration isolators having an improved hydraulic damping performance, which are suitable for use as engine mounts or the like serving to support power units or motor vehicles.

A known rubber vibration isolator for use in engine mounts utilizes the damping action of a liquid. FIG. 1 illustrates an example of such a conventional rubber vibration isolator, wherein upper and lower parts 5, 6 of an annular rubber elastomer are divided by a supporting plate 4 embedded therein. The upper and lower parts are arranged between a pair of upper and lower plates 1, 2 to define a hollow chamber. The upper plate 1 is provided with a stud 3 for supporting a vibrating body such as a power unit or the like, while the supporting plate 4 is secured to a vehicle body. Further, the hollow chamber is divided into two upper and lower chambers $R_1$, $R_2$ communicating with each other through a restricted passage or an orifice 7, which is formed by extending the rubber elastomer toward the center thereof to approximately equally divide the hollow chamber into two parts. In each of these chambers $R_1$, $R_2$, an incompressible liquid such as water or the like is placed. In FIG. 1, numeral 8 indicates an outer sleeve.

According to the rubber vibration isolator of the above mentioned structure, the damping effect of the liquid is developed by cooperation of the upper and lower chambers $R_1$, $R_2$ with the orifice 7 against only up and down, or longitudinal, vibration. However, the engine mount is also effected by a lateral vibration in addition to the simple longitudinal vibration. The conventional rubber vibration insulator does not exhibit hydraulic damping performance against lateral vibration.

It is, therefore, an object of the invention to improve the aforementioned drawback of the prior art and to effectively perform the hydraulic damping against both longitudinal and lateral vibrations.

According to the invention, a rubber vibration isolator comprises a pair of upper and lower liquid chambers capable of changing volumes by elastic deformation of an annular rubber elastomer accompanied with longitudinal vibration. A restricted passage provides communication between the chambers. At least two liquid chambers capable of changing their volumes accompanied with lateral vibration are formed in an outer periphery of the annular rubber elastomer and communicate with each other through another restricted passage.

The invention will now be described with reference to the accompanying drawings, wherein:

FIG. 1 is a longitudinal sectional view of the conventional rubber vibration isolator as mentioned above;

FIG. 2 is a longitudinal sectional view of an embodiment of the rubber vibration isolator according to the invention;

FIG. 3 is a transverse sectional view taken along the line III—III of FIG. 2;

FIG. 4 is a longitudinal sectional view of another embodiment of the rubber vibration isolator according to the invention;

FIG. 5 is a longitudinal sectional view taken along the line V—V of FIG. 4;

FIG. 6 is a transverse sectional view taken along the line VI—VI of FIG. 4;

FIG. 7 is a longitudinal sectional view of a further embodiment of the rubber vibration isolator according to the invention.

Figure 8:
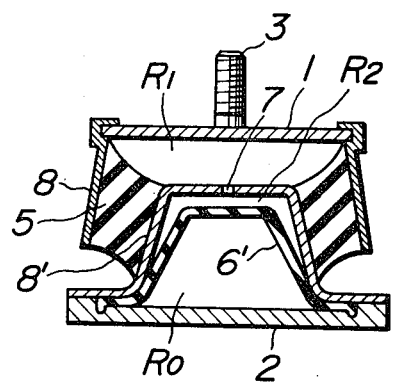
FIGS. 8 and 9 are longitudinal sectional views of still further embodiments of the rubber vibration isolator according to the invention, respectively.

In FIG. 2 is shown a first embodiment of the rubber vibration isolator according to the invention relating to an improvement of the rubber vibration isolator shown in FIG. 1. FIG. 3 shows the transverse section of the rubber vibration isolator taken along the line III—III of FIG. 2. In these figures, like parts are designated by like numerals and like symbols.

The rubber vibration isolator of FIG. 2 has the same structure as shown in FIG. 1 in that the hollow chamber is formed by arranging the annular rubber elastomer (5, 6) between a pair of upper and lower rigid plates 1, 2, divided into two liquid chambers $R_1$, $R_2$ by the orifice 7 for communicating these chambers with each other and filled with incompressible liquid. According to the invention however, two liquid chambers $R_3$, $R_4$ are further formed in the outer periphery of the annular rubber elastomer 5 at symmetrical positions in the circumferential direction thereof and communicate with each other through an annular orifice (or a restricted passage) 9 as shown in FIG. 3.

In the rubber vibration isolator of the above structure as illustrated, longitudinal vibration is damped by the hydraulic damping action based on the flowing of the liquid between the chambers $R_1$ and $R_2$ through the orifice 7, while lateral vibration is damped by the hydraulic damping action based on the flowing of the liquid between the chambers $R_3$ and $R_4$ through the orifice 9. Moreover, the hydraulic damping action against the lateral vibration produces anisotropy by the arrangement of the liquid chambers $R_3$, $R_4$, but in this case, such anistropy can considerably be mitigated, for example, by biasing the relation in position between the chambers $R_3$ and $R_4$, or by providing an additional liquid chamber at the middle position of the orifice 9.

In the illustrated embodiment, the upper and lower chambers $R_1$, $R_2$ and the right and left chambers $R_3$, $R_4$ communicate through only the separate orifices 7 and 9, but it is a matter of course that these chambers may be in communication with each other through orifices, if necessary.

FIG. 4 shows another embodiment of the rubber vibration isolator according to the invention, wherein an annular rubber elastomer 12 is received in an outer sleeve 11 provided with an annular outer flange 10 extending radially from the sleeve and being secured to a vehicle body, while a cup-type inner sleeve 14 provided with a stud 13 for supporting a vibrating body is forced into the elastomer 12. In this case, an annular ring 15 is integrally bonded by vulcanization to the outer periphery of the elastomer 12 and fitted into the outer sleeve 11. Further, a bag-like rubber body 16 extends around the lower end of the outer sleeve 11 to define a hollow chamber together with the outer sleeve, annular rubber elastomer, ring body and inner sleeve. The hollow chamber is divided into upper and lower liquid chambers $R_1$, $R_2$ by adheringly joining an orifice plate 18 provided with an orifice 17 to the inner periphery of the outer sleeve 11 near the flange part thereof through the rubber body 16. In particular, left and right liquid chambers $R_3$, $R_4$ are formed in the outer periphery of the rubber elastomer 12 and the ring body 15 at given positions and communicate with each other through orifices 19 formed in the outer periphery of the ring body 15 as shown in FIGS. 5 and 6 showing the sections of FIG. 4 along lines V—V and VI—VI.

In this embodiment, the performance as a rubber vibration isolator is the same as shown in FIG. 2. Since the orifice 19 communicating the chambers $R_3$, $R_4$ with each other is formed as a groove excavated in the ring body 15 and is limited by the inner periphery of the outer sleeve 11, there is no deviation in the channeling sectional area and length of the orifice 19. Consequently, lateral damping performance can be developed in accordance with this invention.

FIG. 7 illustrates a further embodiment of the rubber vibration isolator according to the invention, wherein an annular rubber elastomer 22 is received in the inside of a cup-type rigid body 21 provided at its bottom with a stud 20 to be secured to a vehicle body. In this case, an annular ring body 23 is integrally bonded by vulcanization to the outer periphery of the rubber elastomer 22 and is fitted into the rigid body 21 in the same manner as described in FIG. 4. Further, an inner sleeve 25 provided at its top with a stud 24 to be secured to a vibrating body is forced into the inner periphery of the rubber elastomer. Also, a bag-like rubber body 26 is arranged inside the inner sleeve 25 and integrally bonded thereto (in the illustrated embodiment, the rubber body 26 is integrally bonded to a part of the rubber elastomer 22). Then, a hollow chamber defined by the rubber body 26, the rubber elastomer 22 and the rigid body 21 is divided into upper and lower liquid chambers $R_1$, $R_2$ by fitting an orifice plate 28 provided with an orifice 27 to the inner periphery of the inner sleeve 25 near the lower end thereof to provide communication between these chambers through the orifice 27. According to the invention, plural liquid chambers $R_3$, $R_4$... are formed in the outer periphery of the rubber elastomer 22 and the ring body 23 at given positions and communicate with each other through an orifice (not shown) having the same structure as shown in FIGS. 5 and 6.

In FIG. 8 is shown a preferred embodiment of the rubber vibration isolator according to the invention utilizing hydraulic damping performance, which is particularly related to an improvement of the rubber vibration isolator previously set forth herein. In this case, an outer sleeve 8 and an inner sleeve 8' are secured to outer and inner peripheral surfaces of an annular rubber elastomer 5, respectively. The inner sleeve 8' has an inverted cup shape, the bottom of which is provided with an orifice 7. The rubber elastomer 5 and the inner sleeve 8' form an upper liquid chamber $R_1$ with an upper rigid plate 1 secured to the outer sleeve 8. Inside the inner sleeve 8' is arranged an inverted cup-shaped rubber body 6' to define a lower liquid chamber $R_2$. Its lower end is secured to the inner sleeve 8' by means of a lower rigid plate 2. Moreover, a pressurized gas is enclosed in a closed hollow space $R_0$ defined between the rubber body 6' and the lower plate 2 as shown in FIG. 8, whereby a favourable damping performance can further be developed. That is, in the rubber vibration isolator of FIG. 8, the rubber body 6' functions toward its folding direction without being subjected to a tension under the vibration loading.

Figure 9:
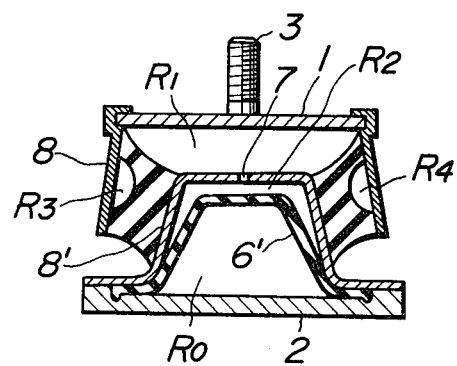

In FIG. 9 is shown a modified embodiment of the rubber vibration isolator illustrated in FIG. 8, wherein liquid chambers $R_3$, $R_4$ are formed in the outer periphery of the rubber elastomer 5 facing the outer sleeve 8 and communicate with each other through an orifice (not shown) in the same manner as previously mentioned.

According to this illustrated embodiment, both the longitudinal and lateral damping performances are simultaneously developed. Also, even if the rubber body 6' is broken down, the liquid filled in the liquid chambers $R_1$, $R_2$ flows into only the hollow space $R_0$ does not leak out of the liquid chamber. In this case, vibration loading can be borne by only the rubber elastomer 5. Therefore, the rubber vibration isolator of FIG. 9 is excellent in security.

As explained above, the rubber vibration isolator according to the invention makes it possible to develop proper damping performance against both longitudinal and lateral vibrations and is very wide in its range of application.

What is claimed is:

1. A rubber vibration isolator comprising; a pair of upper and lower liquid chambers capable of changing volumes of elastic deformation of an annular rubber elastomer accompanied with longitudinal vibration, and a first restricted passage for establishing communication between said chambers, a circumferential sleeve at the outer periphery of said rubber elastomer, at least two liquid spaces capable of changing volumes accompanied with lateral vibration formed in the circumferential direction between said rubber elastomer and said circumferential sleeve, said liquid spaces formed in the circumferential direction between said rubber elastomer and said circumferential sleeve in fluid communication with each other through a second restricted passage.

2. A rubber vibration isolator as claimed in claim 1, wherein said liquid spaces are filled with an incompressible liquid.

3. A rubber vibration isolator as claimed in claim 1, wherein said upper and lower chambers and two liquid spaces communicate with each other through additional restricted passages.

4. A rubber vibration isolator as claimed in claim 1, wherein said first restricted passage is axially aligned between said upper and lower liquid chambers.

5. A rubber vibration isolator as claimed in claim 1, wherein said second restricted passage is an annular passage between said two liquid spaces.

* * * * *